(12) United States Patent
Chiang (10) Patent No.: US 7,524,182 B2
(45) Date of Patent: Apr. 28, 2009

(54) BLOWING MECHANISM

(76) Inventor: Fu-Chuan Chiang, No. 90, Dongcheng Rd., North Dist., Taichung (TW)

( * ) Notice: Subject to any disclaimer, the term of this patent is extended or adjusted under 35 U.S.C. 154(b) by 384 days.

(21) Appl. No.: 11/545,878

(22) Filed: Oct. 11, 2006

(65) Prior Publication Data

US 2008/0089974 A1    Apr. 17, 2008

(51) Int. Cl.
   B29C 49/20   (2006.01)
   B29C 49/70   (2006.01)
   B29C 31/08   (2006.01)
(52) U.S. Cl. .................. 425/503; 425/522; 425/525; 425/534; 425/537
(58) Field of Classification Search .............. 425/503, 425/522, 525, 534, 537, 538, 539; 264/516
   See application file for complete search history.

(56) References Cited

U.S. PATENT DOCUMENTS 4,952,133 A * 8/1990 Hasegawa et al. .......... 425/503
4,963,086 A * 10/1990 Wiatt et al. ................. 425/526
5,167,970 A * 12/1992 Yoshino et al. ............. 425/525
5,338,503 A * 8/1994 Yanagisawa et al. ........ 264/516
6,241,939 B1 * 6/2001 Takada et al. ............... 264/535

* cited by examiner

Primary Examiner—Robert B Davis
(74) Attorney, Agent, or Firm—Jackson Walker, LLP (57) ABSTRACT

A blowing mechanism has a body, a moving device and a supplying device. The body has an annular track, a mold assembly and a mounting frame. The moving device is connected to the body and has a mounting bracket, an upper rail device, a lower rail device and a transmitting device. The mounting bracket is connected to the body. The upper rail device is connected movably to the mounting bracket and has a rail, a connecting board, a belt and two rail seats. The lower rail device is connected to the upper rail device and has an inner rail and a bottom board. The transmitting device is connected to the mounting bracket and the lower rail device and has an upper rack, a lower rack and a turning gear. The supplying device is mounted on the body and has a case, a supplying guide and a supplying arm.

10 Claims, 12 Drawing Sheets

BLOWING MECHANISM

BACKGROUND OF THE INVENTION

1. Field of the Invention

The present invention relates to a blowing mechanism, and more particularly to a blowing mechanism that can increase the efficiency for manufacturing plastic bottles.

2. Description of Related Art

A conventional blowing mechanism is used to manufacture plastic bottles and comprises a body, an annular track with multiple bottle seats, a heating apparatus and a mold assembly.

The annular track is mounted over the body by multiple mounting shafts. The bottle seats are mounted respectively in the bottom of the annular track and are used to hold the plastic bottles. The heating apparatus is mounted on the body and is used to heat the plastic bottles on the bottle seats.

The mold assembly is mounted on the body near the heating apparatus and has a first mold, a second mold and a handle-supplying device. The molds are mounted on the body and below the annular track and each mold has two cavities. The handle-supplying device is connected to the body over the second mold to supply peripherals such as handles to the cavities of the second mold.

The operation process of the conventional blowing mechanism is firstly moving the annular track to apply the plastic bottles between the first mold and the second mold and corresponding to the cavities. Then, the handle-supplying device supplies handles into the cavities in the second mold. The molds are moved to close to each other to attach the handles onto the plastic bottles.

Therefore, the conventional blowing mechanism takes times for supplying handles into the cavities of the second mold with the handle-supplying device, and this will decrease the efficiency of but increase cost for manufacturing plastic bottles.

Therefore, the invention provides a blowing mechanism to mitigate or obviate the aforementioned problems.

SUMMARY OF THE INVENTION

The main objective of the present invention is to provide a blowing mechanism that can increase the efficiency for manufacturing plastic bottles.

The blowing mechanism has a body, a moving device and a supplying device. The body has an annular track, a mold assembly and a mounting frame. The moving device is connected to the body and has a mounting bracket, an upper rail device, a lower rail device and a transmitting device. The mounting bracket is connected to the body. The upper rail device is connected movably to the mounting bracket and has a rail, a connecting board, a belt and two rail seats. The lower rail device is connected to the upper rail device and has an inner rail and a bottom board. The transmitting device is connected to the mounting bracket and the lower rail device and has an upper rack, a lower rack and a turning gear. The supplying device is mounted on the body and has a case, a supplying guide and a supplying arm.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
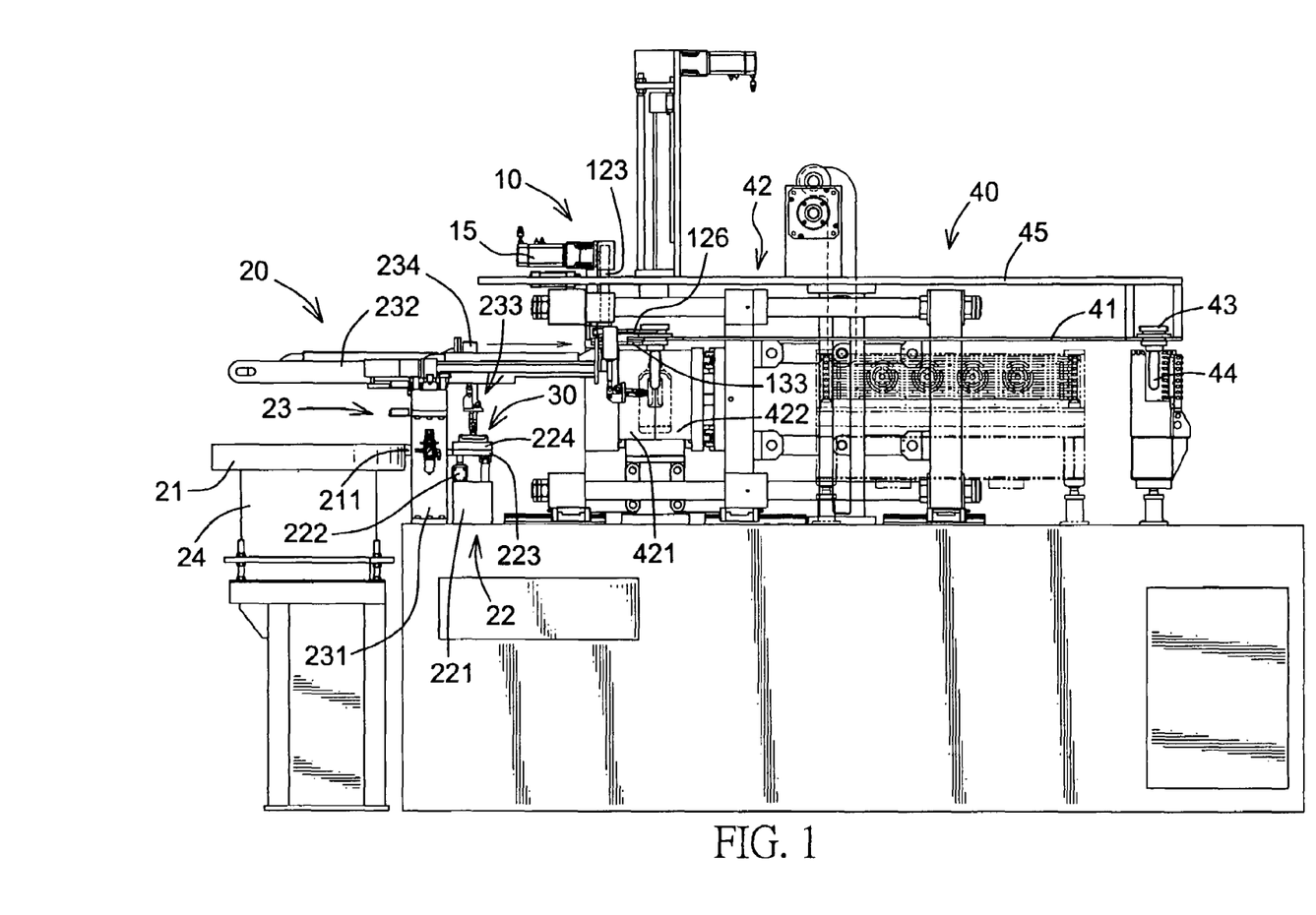
FIG. 1 is a side view of a blowing mechanism in accordance with the present invention.
Figure 2:
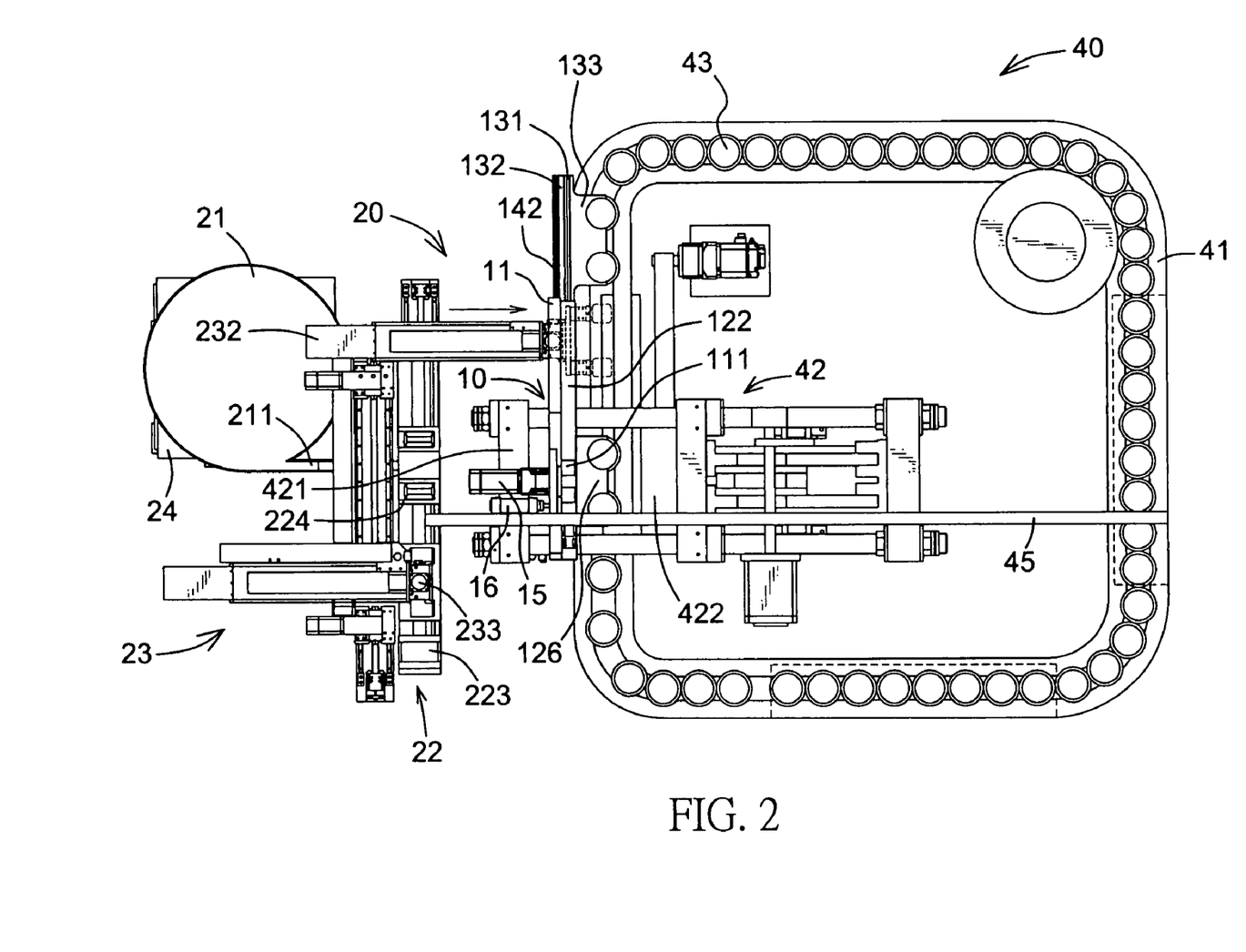
FIG. 2 is a top view of the blowing mechanism in FIG. 1.
Figure 3:
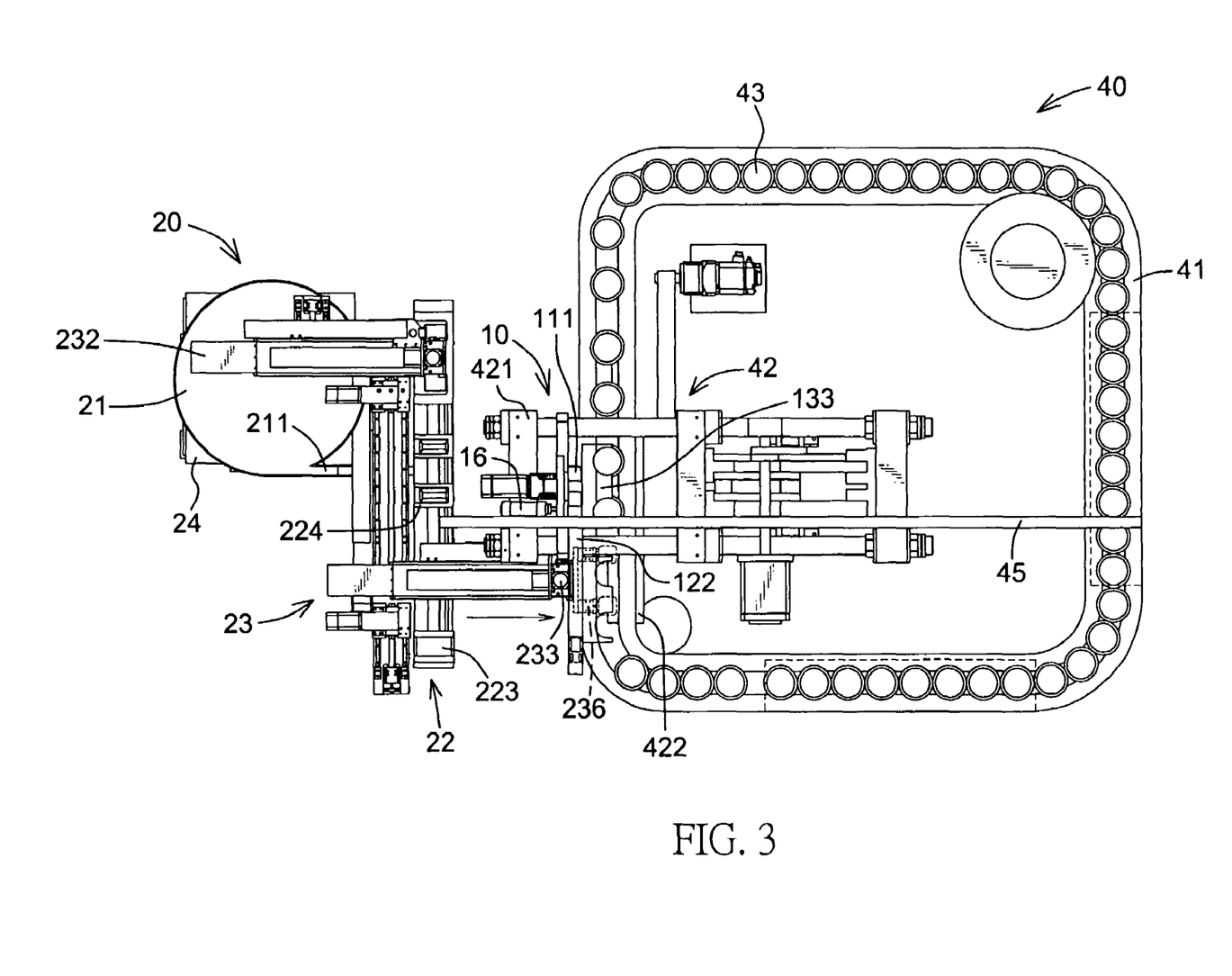
FIG. 3 is an operational top view of the blowing mechanism in FIG. 1.
Figure 4:
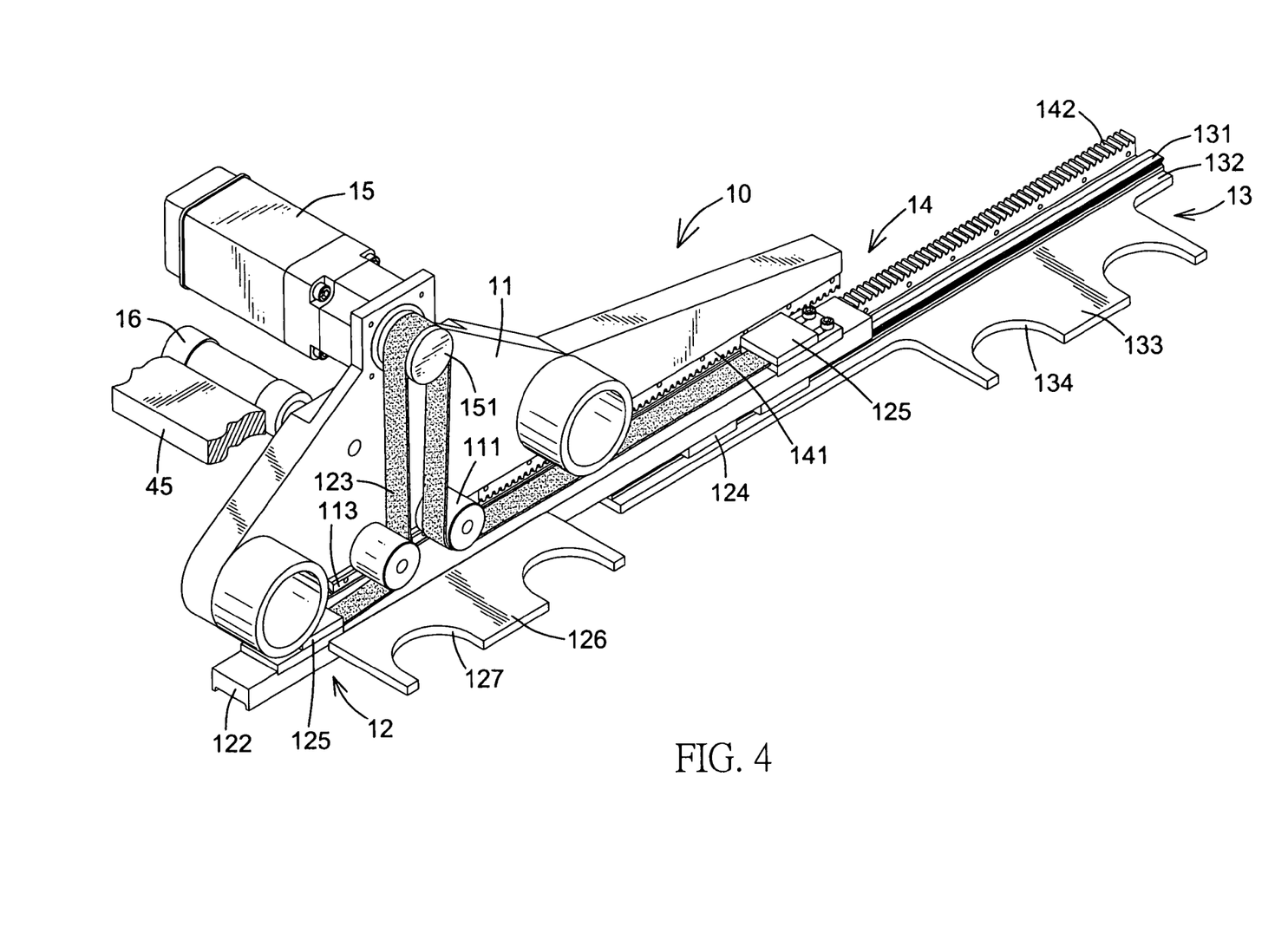
FIG. 4 is an enlarged perspective view of a moving device of the blowing mechanism in FIG. 1.
Figure 5:
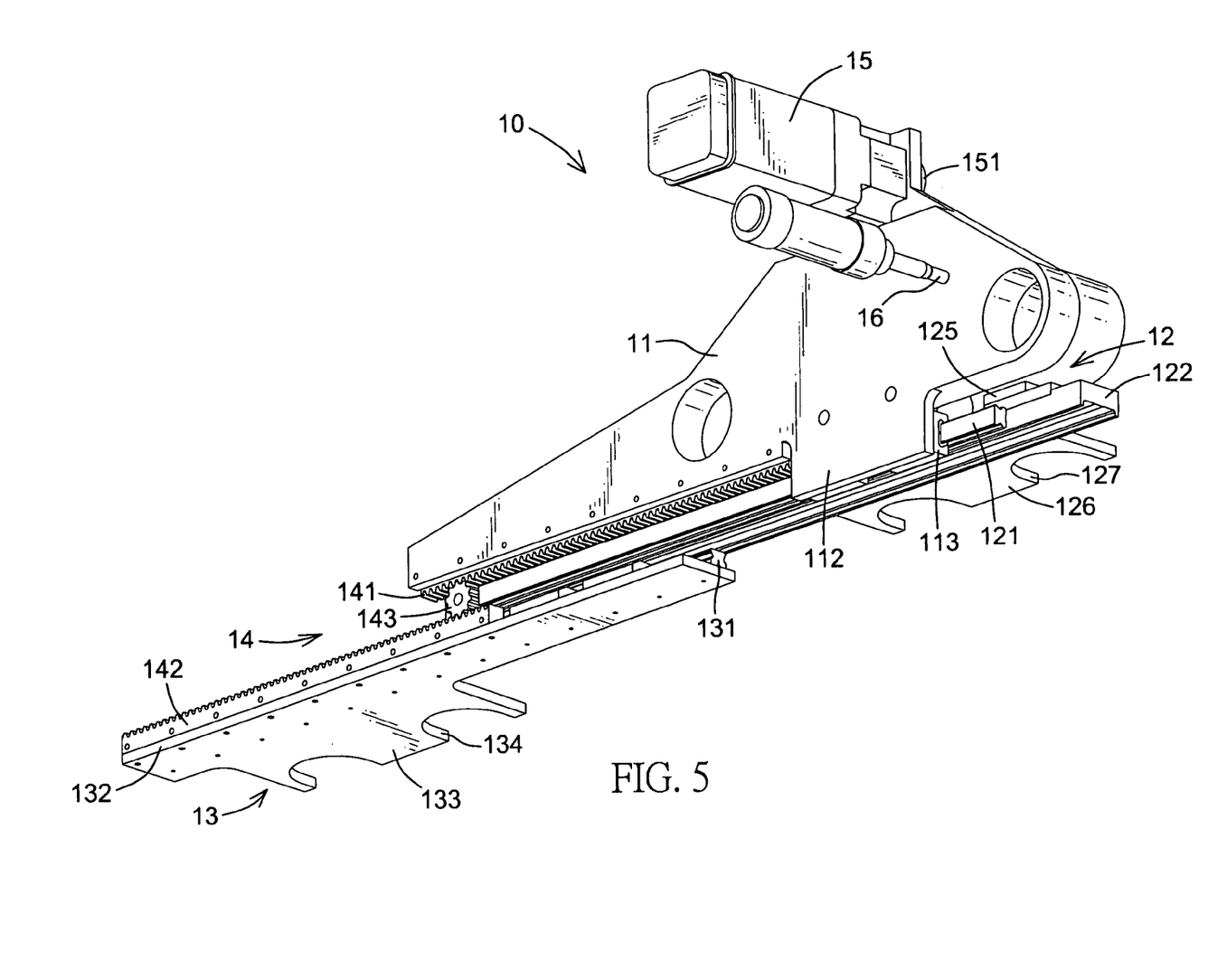
FIG. 5 is another enlarged perspective view of the moving device of the blowing mechanism in FIG. 1.
Figure 6:
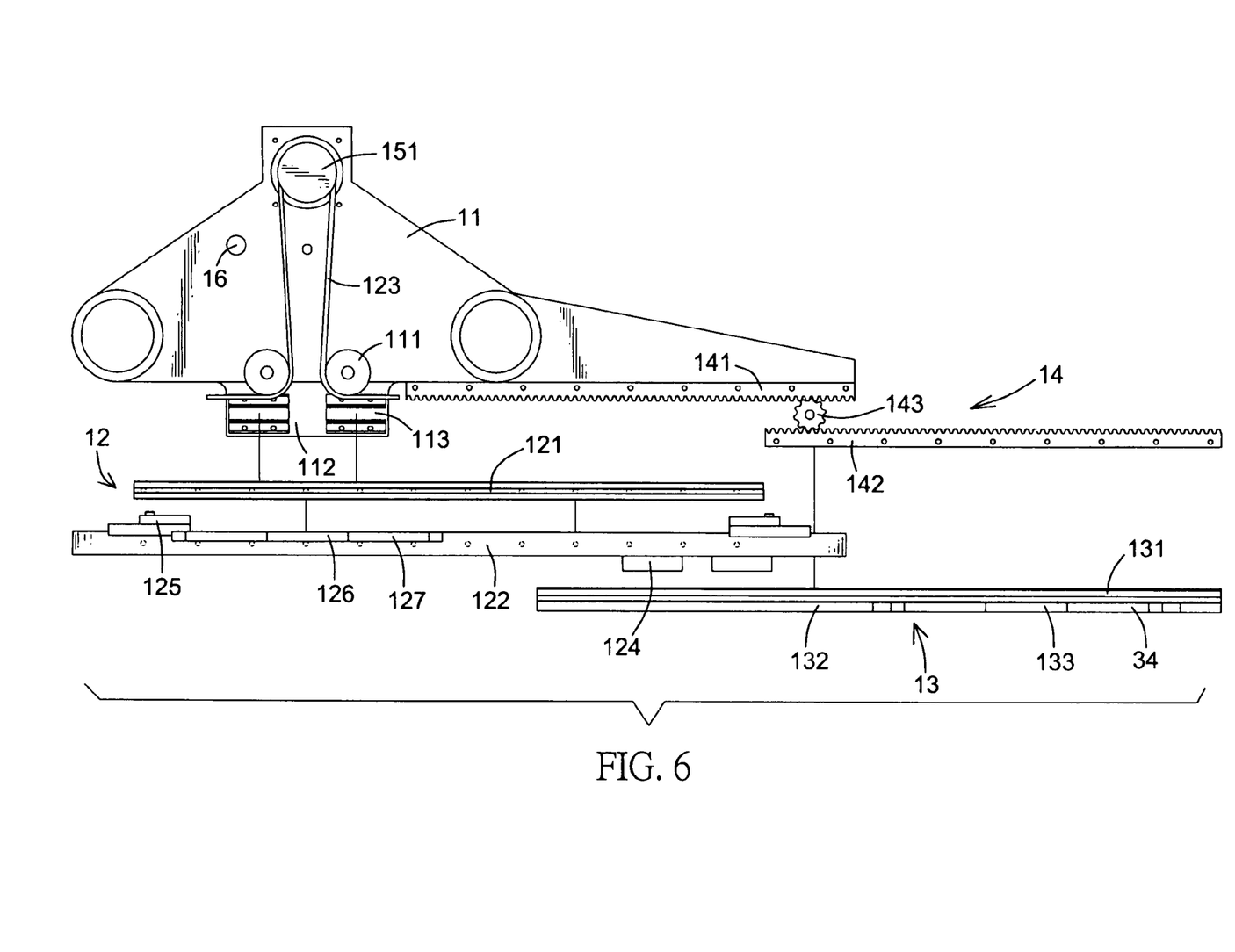
FIG. 6 is an operational side view of the moving device of the blowing mechanism in FIG. 4.
Figure 7:
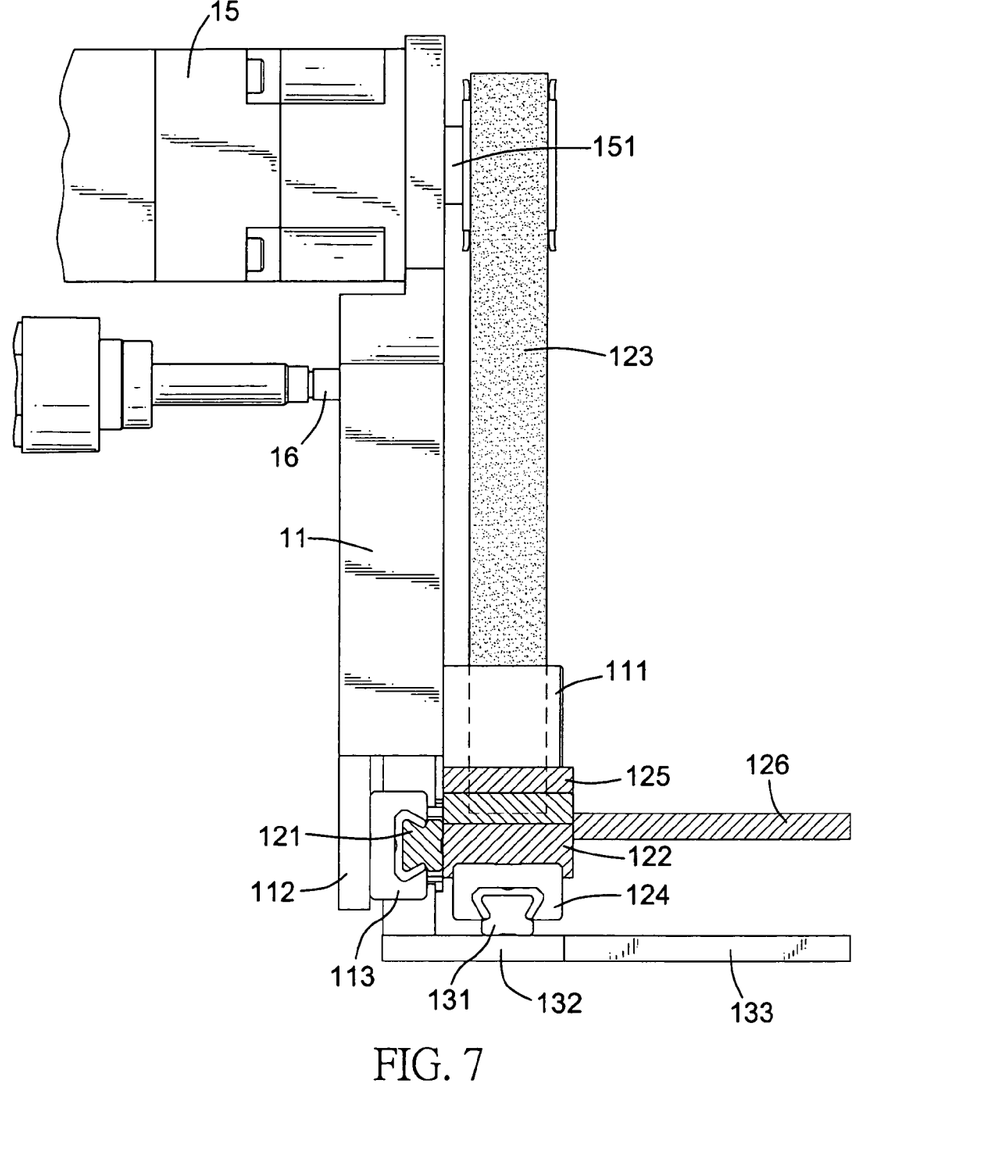
FIG. 7 is a side view in partial section of the moving device of the blowing mechanism in FIG. 4.

With reference to FIGS. 1 to 3, a blowing mechanism in accordance with the present invention has a body (40), a moving device (10) and a supplying device (20).

The body (40) has an annular track (41), a mold assembly (42) and a mounting frame (45). The annular track (41) is mounted over the body (40) by multiple mounting shafts and has multiple bottle seats (43) and multiple rude plastic bottles (44) mounting in the bottle seats (43). The mold assembly (42) is mounted on the body (40) below the annular track (41) and has a first mold (421) and two second molds (422). The mounting frame (45) is connected to the body (40) over the mold assembly (42).

With reference to FIGS. 1 and 4 to 7, the moving device (10) is mounted over the first mold (421) of the mold assembly (42) faces to the bottle seats (43) and comprises a mounting bracket (11), an upper rail device (12), a lower rail device (13) and a transmitting device (14).

The mounting bracket (11) may be triangle-shaped, is connected to the body (40) of the blowing mechanism and has a top end, an inner side, an outer side, a bottom, a motor (15), two rollers (111), a hydraulic cylinder (16), an extending board (112) and two rail seats (113).

The mounting bracket (11) is slidably connected to the mold assembly (42). The motor (15) is connected to the top end of the mounting bracket (11) and has a rotating shaft (151). The rotating shaft (151) is extended from the outer side to the inner side of the mounting bracket (11) and faces one of the second molds (422). The rollers (111) are mounted on the inner side of the mounting bracket (11) below the rotating shaft (151) and between the lower ends of the mounting bracket (11).

The hydraulic cylinder (16) is connected to the mounting bracket (11) between the motor (15) and the rollers (111) and is connected to the mounting frame (45) of the blowing mechanism to push and pull the mounting bracket (11). The extending board (112) is formed in the bottom of the mounting bracket (11) below the rollers (111). The rail seats (113) are mounted on the extending board (112) and face to the rollers (111).

The upper rail device (12) is connected movably to the mounting bracket (11) and has a rail (121), a connecting board (122), a belt (123) and two rail seats (124). The rail (121) is attached slidably to the extending board (112) of the mounting bracket (11) and has an outer side and an inner side.

The outer side of the rail (121) is attached slidably to the rail seats (113) on the extending board (112) of the mounting bracket (11).

The connecting board (122) is connected securely to the rail (121) below the rollers (111) and has a rear side, a front side, a top, a bottom, two ends, two mounting boards (125) and a clipping board (126). The rear side of the connecting board (122) is connected securely to the inner side of the rail (121). The mounting boards (125) are mounted on the top of the connecting board (122) respectively in the ends. The clipping board (126) is connected to the front side of the connecting board (122) and has two clipping holes (127). The clipping holes (127) are semicircle-shaped.

The belt (123) is connected to the connecting board (122) and the mounting bracket (11) and has two connecting ends. One of the connecting ends is mounted with one of the mounting boards (125), and the other connecting end of the belt (123) is mounted around the rollers (111) and the rotating shaft (151) of the motor (15) and connected to the other mounting board (125). Thus, the belt (123) can move the connecting board (122) and the rail (121) relative to the mounting bracket (11) by the rotation of the rotating shaft (151). The rail seats (124) of the upper rail device (12) are connected to the bottom of the connecting board (122) and opposite to the clipping board (126).

The lower rail device (13) is connected to the upper rail device (12) and has an inner rail (131) and a bottom board (132). The inner rail (131) is attached slidably to the rail seats (124) of the upper rail device (12) and has a top and a bottom. The top of the inner rail (131) is connected to the rail seats (124). The bottom board (132) is connected securely to the bottom of the inner rail (131) and has a front side, a free end and a clipping board (133). The clipping board (133) is formed on the front side of the bottom board (132) near the free end and has two clipping holes (134). The clipping holes (134) are semicircle-shaped.

The transmitting device (14) is connected to the mounting bracket (11) and the lower rail device (13) and has an upper rack (141), a lower rack (142) and a turning gear (143). The upper rack (141) is mounted on the bottom of the mounting bracket (11) and has a bottom and multiple teeth. The teeth are formed on the bottom of the upper rack (141).

The lower rack (142) is mounted on the bottom board (132) near the inner rail (131) and below the upper rack (141) and has a top and multiple teeth. The teeth are formed on the top of the lower rack (142) and face to the teeth on the upper rack (141). The turning gear (143) is connected rotatably to the rear side of the connecting board (122) near the rail (121) of the upper rail device (12), is engaged with the teeth on the upper rack (141) and the lower rack (142).

With reference to FIGS. 1 to 3, 8 and 9, the supplying device (20) is mounted on the body (40) of the blowing mechanism and has a case (21), a supplying guide (22) and two supplying arms (23). The case (21) is mounted horizontally near the body (40) of the blowing mechanism and has a chamber, a guiding channel (211) and a shaking device (24). The chamber is defined in the case (21) and is used to store handles (30). The guiding channel (211) is formed in the case (21), faces to the body (40) of the blowing mechanism and communicates with the chamber of the case (21). The shaking device (24) is mounted below the case (21), is used to shake the case (21) and makes the handles (30) moving to the guiding channel (211).

Figure 8:
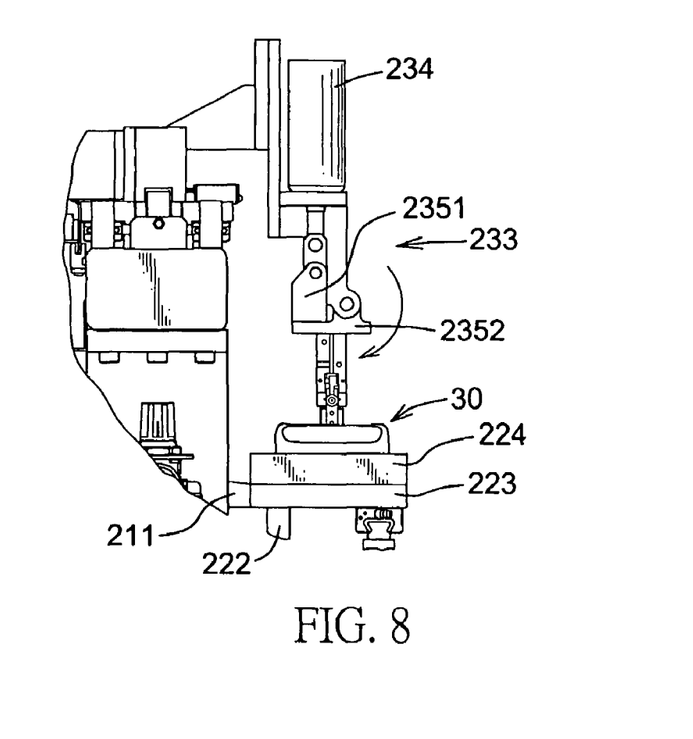
FIG. 8 is an enlarged operational side view of a supplying device of the blowing mechanism in FIG. 1.
Figure 9:
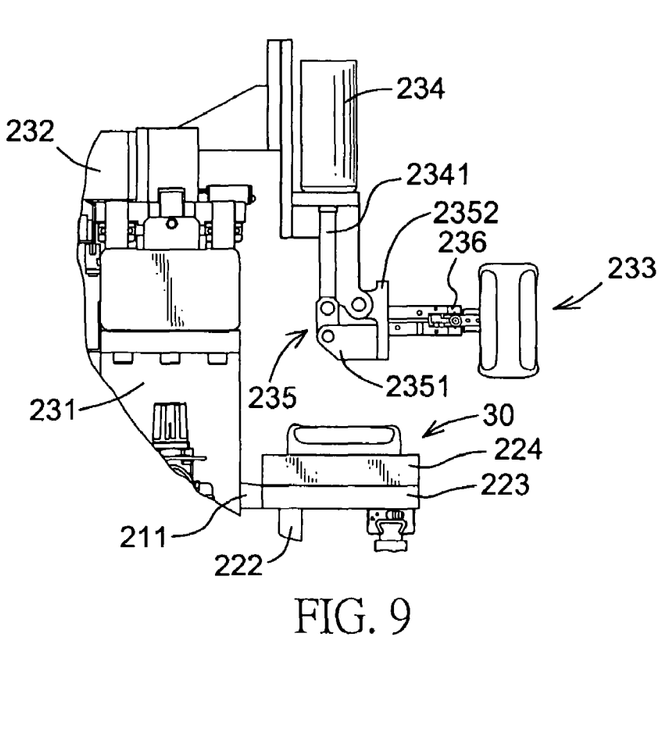
FIG. 9 is another enlarged operational side view of the supplying device of the blowing mechanism in FIG. 1.
Figure 10:
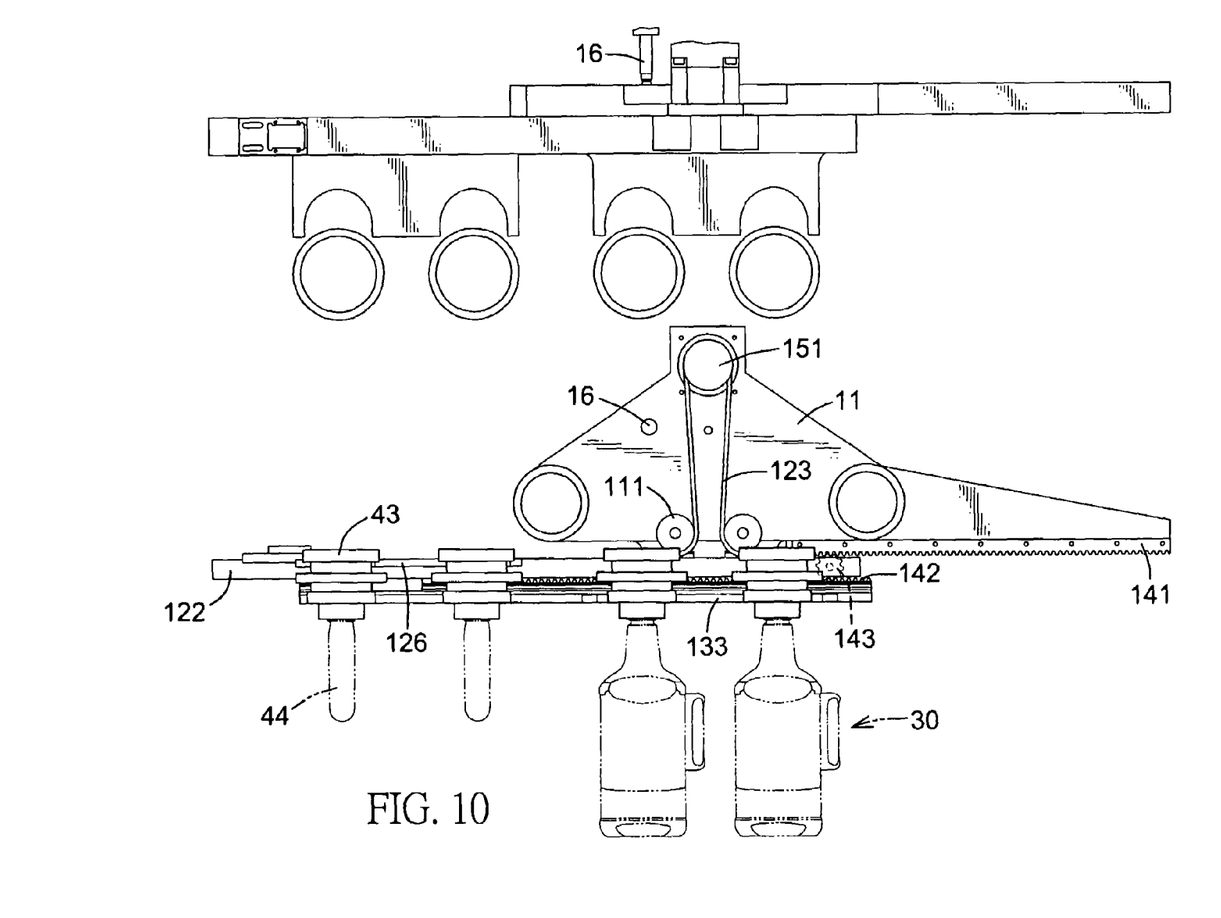
FIGS. 10 to 13 are operational side views of the moving device of the blowing mechanism in FIG. 1.
Figure 11:
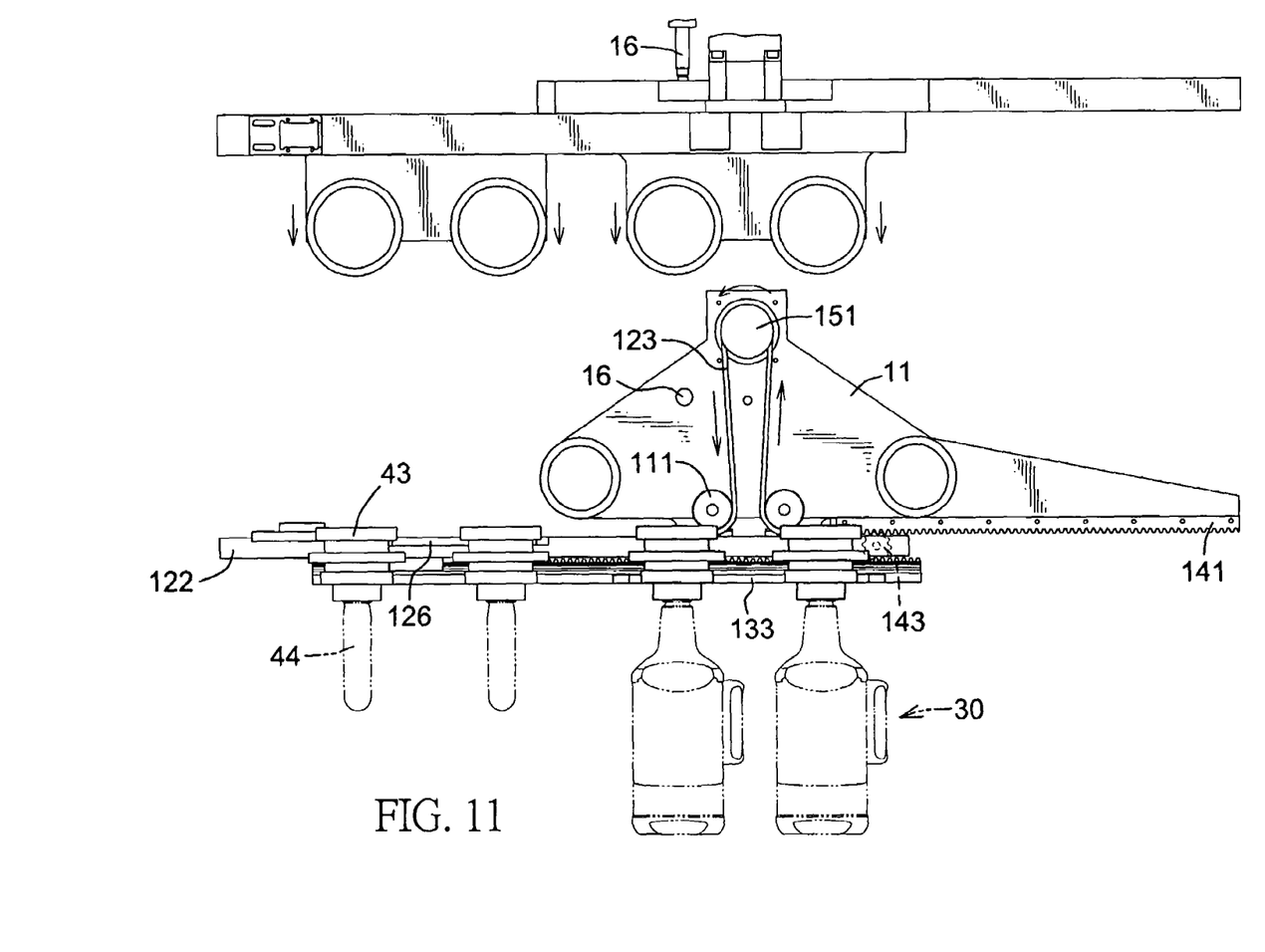

The supplying guide (22) is mounted on the body (40) of the blowing mechanism, is parallel with the moving device (10) and has a guiding seat (221), a driving shaft (222) and a moving board (223). The guiding seat (221) is mounted on the body (40) of the blowing mechanism. The driving shaft (222) is connected horizontal to the guiding seat (221). The moving board (223) is connected to the driving shaft (222) over the guiding seat (221) and has two pairs of limiting grooves (224).

The supplying arms (23) are mounted on the body (40) of the blowing mechanism between the case (21) and the supplying guide (22), are used to put handles (30) into the second molds (422) and each supplying arm (23) has a mounting shaft (231), a moving beam (232) and a rotating arm (233). The mounting shaft (231) is mounted on the body (40) of the blowing mechanism and has a top end. The moving beam (232) is attached movably to the top end of the mounting shaft (231), is opposite to the body (40) of the blowing mechanism and has an inner end.

The rotating arm (233) is connected to the moving beam (232) and has a driven segment (234), a rotating segment (235) and two inserting posts (236). The driven segment (234) is connected to the inner end of the moving beam (232) and has a driving post (2341). The rotating segment (235) is connected to the driven segment (234) and has multiple connecting pieces (2351) and a base (2352). The connecting pieces (2351) are pivotally connected with each other by pivots, and one of the connecting pieces (2351) is connected to the driving post (2341) of the driven segment (234). The base (2352) is connected to one of the connecting pieces (2351) opposite to the driving post (2341).

The inserting posts (236) are mounted on the base (2352), are opposite to the connecting pieces (2351) and face one pair of the limiting grooves (224) in the supplying guide (22).

With reference to FIGS. 10 to 13, when the plastic bottles (44) are moved by the annular track (41) to a position between the first mold (421) and one of the second molds (422). After the mold assembly (42) blowing and forming the plastic bottles (44) with the handles (30), the hydraulic cylinder (16) of the upper rail device (12) pushes the mounting bracket (11) toward the annular track (41), and the clipping holes (134) of the clipping board (133) in the lower rail device (13) will engaged with the bottle seats (43) with the finished plastics bottles (44). In addition, the clipping holes (127) of the clipping board (126) in the upper rail device (12) will engaged with the bottle seats (43) with the rude plastics bottles (44) adjacent to the finished plastics bottles (44).

At this time, the motor (15) of the moving device (10) rotates the rotating shaft (151) to move the belt (123), and the connecting board (122) is moved relative to the mounting bracket (11). The bottle seats (43) with the rude plastics bottles (44) in the clipping holes (127) of the clipping board (126) are moved between the first mold (421) and the corresponding second molds (422). The bottle seats (43) with the finished plastics bottles (44) in the clipping holes (134) of the clipping board (133) are moved to one side of the first mold (421).

Figure 12:
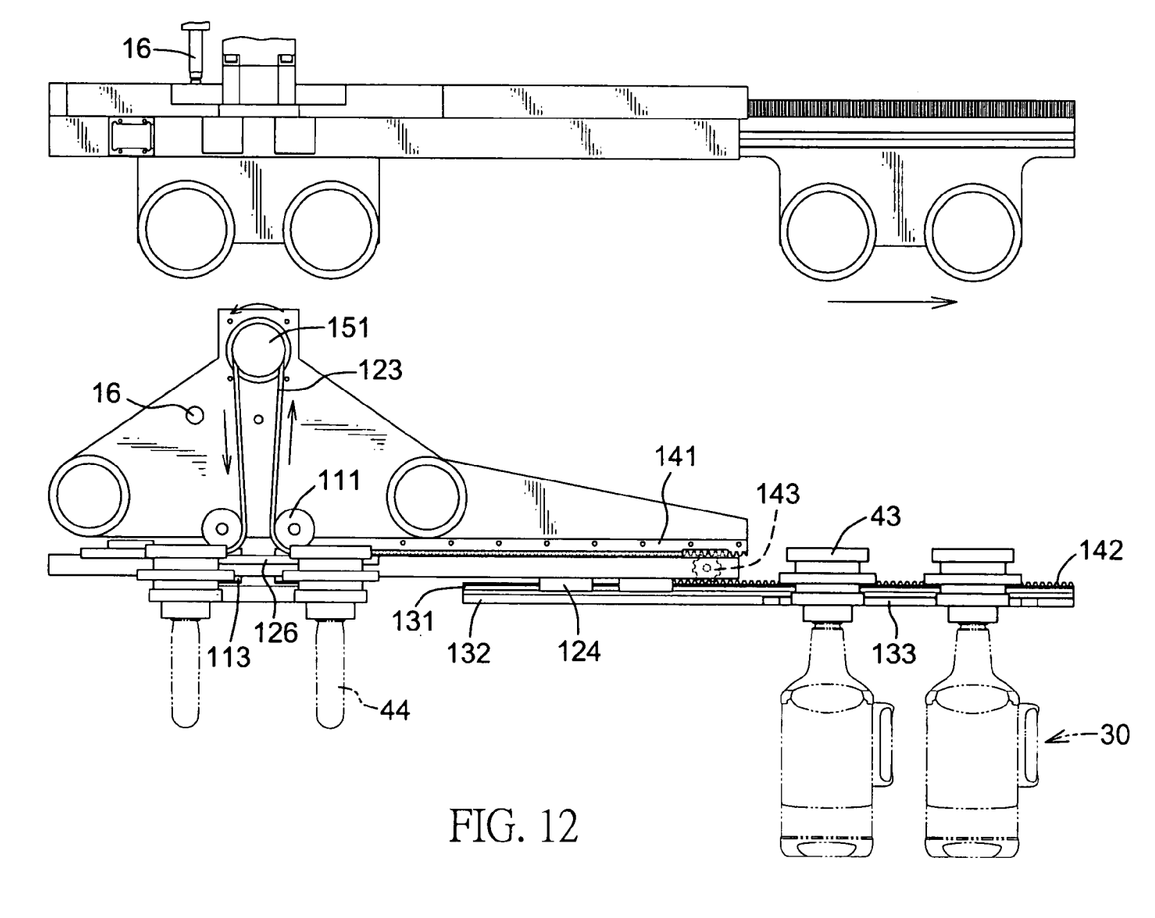

At the same time, the lower rail device (13) moves with the connecting board (122). The turning gear (143) is turned by the upper rack (141) and moves the lower rack (142) and the bottom board (132) away the upper rack (141) as shown in FIG. 12. With further reference to FIG. 2, when the finished plastics bottles (44) in the clipping holes (134) of the clipping board (133) are moved by the lower rack (142), then the finished plastics bottles (44) will not block one of the supplying arms (23) to put handles (30) into the other second mold (422) of the mold assembly (42).

Figure 13:
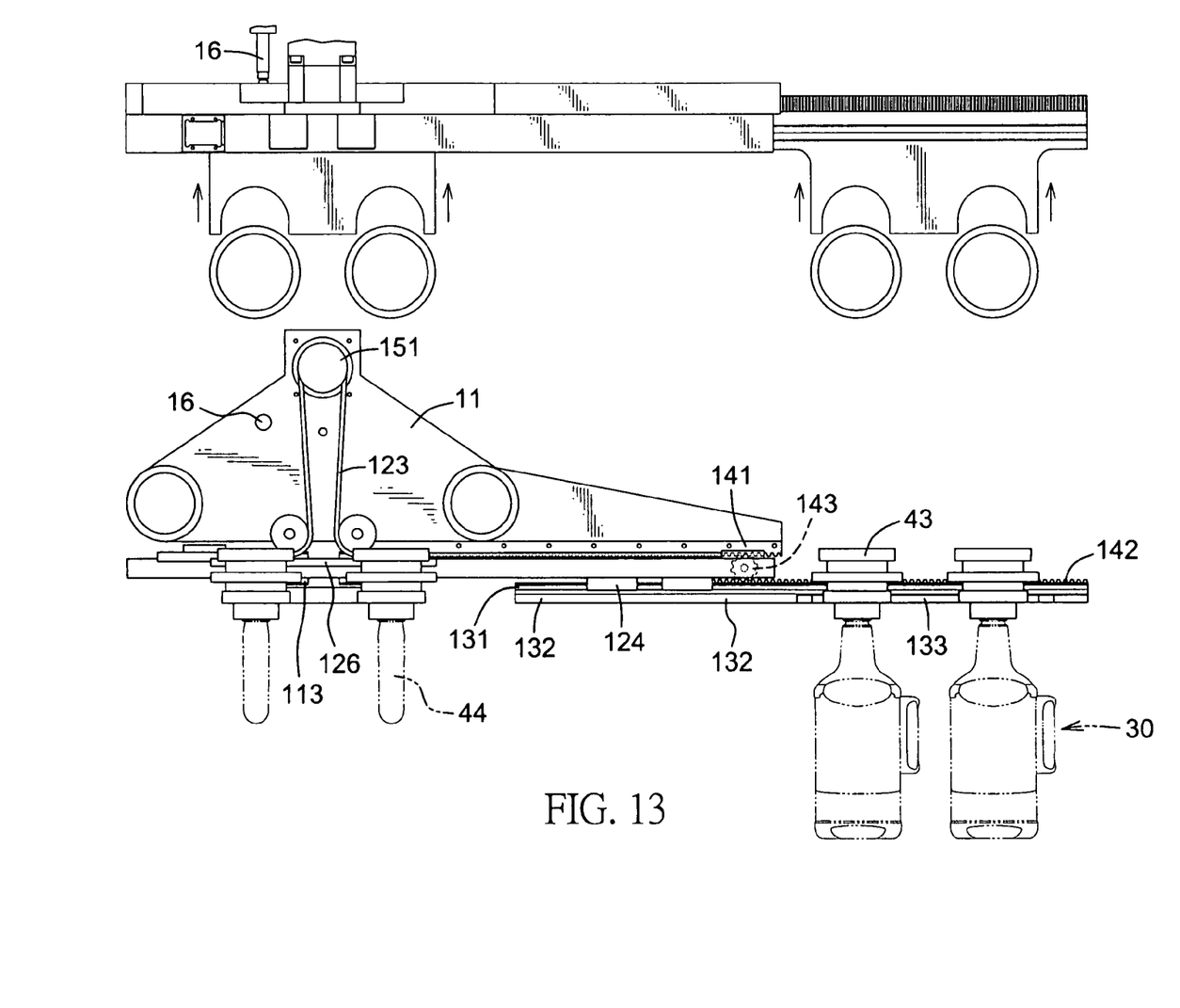

After the supplying arm (23) between the clipping boards (133, 126) putting handles (30) into the corresponding second mold (422), the hydraulic cylinder (16) pulls the mounting bracket (11) away the annular track (41), and the clipping holes (134) of the clipping board (133) will separate from the bottle seats (43) with the finished plastics bottles (44). At this time, the clipping holes (127) of the clipping board (126) will separate from the bottle seats (43) with the rude plastics bottles (44), and the first mold (421) and the corresponding second mold (422) combine to blow and form the rude plastics bottles (44) as shown in FIG. 13.

In the blowing and forming process of the mold assembly (42), the motor (15) of the moving device (10) rotates the rotating shaft (151) in an opposite direction to move the belt (123), and the connecting board (122) is moved backward and toward the other side of the mounting bracket (11). The turning gear (143) is turned by the upper rack (141) and moves the lower rack (142) and the bottom board (132) toward the upper rack (141) and makes the clipping board (133) of the lower rail device (13) over the first mold (421) and the corresponding second mold (422) for another bottle forming process.

Therefore, the blowing mechanism can manufacture the plastic bottle (44) with handles (30) continuously and does not need to wait the supplying device (20) supplying the handles (30) in the second molds (422). Such that the blowing mechanism can provide a smooth manufacture process to increase the efficiency of and decrease the cost for manufacturing plastic bottles (44).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A blowing mechanism comprising
   a body having
      an annular track being mounted over the body by multiple mounting shafts with multiple bottle seats;
      a mold assembly being mounted on the body below the annular track and having
         a first mold; and
         two second molds; and
      a mounting frame being connected to the body over the mold assembly;
   a moving device being mounted over the first mold of the mold assembly and facing the bottle seats and having
      a mounting bracket being slidably connected to the mold assembly and having
         a top end;
         an inner side;
         an outer side;
         a bottom;
         a motor being connected to the top end of the mounting bracket;
         two rollers being mounted on the inner side of the mounting bracket below the motor and between the lower ends of the mounting bracket;
         a hydraulic cylinder being connected to the mounting bracket between the motor and the rollers and being connected to the mounting frame;
         an extending board being formed in the bottom of the mounting bracket below the rollers; and
         two rail seats being mounted on the extending board and facing to the rollers;
      an upper rail device being connected movably to the mounting bracket and having
         a rail being attached slidably to the extending board of the mounting bracket and having
            an outer side being attached slidably to the rail seats of the mounting bracket; and
            an inner side;
         a connecting board being connected securely to the rail below the rollers and having
            a rear side being connected securely to the inner side of the rail;
            a front side;
            a top;
            a bottom;
            two ends;
            two mounting boards being mounted on the top of the connecting board respectively in the ends; and
            a clipping board being connected to the front side of the connecting board;
         a belt being connected to the connecting board and the mounting bracket and has two connecting ends, one of the connecting ends being mounted with one of the mounting boards, and the other connecting end of the belt being mounted around the rollers and the motor and being connected with the other mounting board; and
         two rail seats being connected to the bottom of the connecting board and being opposite to the clipping board;
      a lower rail device being connected to the upper rail device and having
         an inner rail being attached slidably to the rail seats of the upper rail device and having
            a top being connected to the rail seats of the upper rail device; and
            a bottom; and
         a bottom board being connected securely to the bottom of the inner rail and having
            a front side;
            a free end; and
            a clipping board being formed on the front side of the bottom board near the free end; and
      a transmitting device being connected to the mounting bracket and the lower rail device and having
         an upper rack being mounted on the bottom of the mounting bracket and having
            a bottom; and
            multiple teeth being formed on the bottom of the upper rack;
         a lower rack being mounted on the bottom board near the inner rail and below the upper rack and having
            a top; and
            multiple teeth being formed on the top of the lower rack and being faced to the teeth on the upper rack; and
         a turning gear being connected rotatably to the rear side of the connecting board near the rail of the upper rail device, being engaged with the teeth on the upper rack and the lower rack; and
   a supplying device being mounted on the body and having
      a case being mounted horizontally near the body and having
         a chamber being defined in the case to store handles;
         a guiding channel being formed in the case and faced the body and being communicated with the chamber of the case; and
      a shaking device being mounted below the case to shake the case;

a supplying guide being mounted on the body and being parallel with the moving device; and two supplying arms being mounted on the body between the case and the supplying guide.

2. The blowing mechanism as claimed in claim 1, wherein the supplying guide has a guiding seat being mounted on the body;

a driving shaft being connected horizontally to the guiding seat; and a moving board being connected to the driving shaft over the guiding seat and having two pairs of limiting grooves.

3. The blowing mechanism as claimed in claim 2, wherein the supplying arm has a mounting shaft being mounted on the body and having a top end;

a moving beam being attached movably to the top end of the mounting shaft and having an inner end; and a rotating arm being connected to the moving beam.

4. The blowing mechanism as claimed in claim 3, wherein the rotating arm has a driven segment being connected to the inner end of the moving beam and having a driving post;

a rotating segment being connected to the driven segment and having multiple connecting pieces being connected pivotally with each other with pivots, and one of the connecting pieces being connected to the driving post of the driven segment; and a base being connected to one of the connecting pieces and being opposite to the driving post; and two inserting posts being mounted on the base opposite to the connecting pieces and facing to one pair of the limiting grooves in the supplying guide.

5. The blowing mechanism as claimed in claim 4, wherein the motor further has a rotating shaft being extended from the outer side to the inner side of the mounting bracket, and the belt is mounted around the rotating shaft.

6. The blowing mechanism as claimed in claim 5, wherein the clipping board of the upper rail device has two semi-circle-shaped clipping holes; and the clipping board of the lower rail device has two semi-circle-shaped clipping holes.

7. The blowing mechanism as claimed in claim 6, wherein the mounting bracket is triangle-shaped.

8. The blowing mechanism as claimed in claim 1, wherein the motor further has a rotating shaft being extended from the outer side to the inner side of the mounting bracket, and the belt is mounted around the rotating shaft.

9. The blowing mechanism as claimed in claim 1, wherein the clipping board of the upper rail device has two semi-circle-shaped clipping holes; and the clipping board of the lower rail device has two semi-circle-shaped clipping holes.

10. The blowing mechanism as claimed in claim 1, wherein the mounting bracket is triangle-shaped.

\* \* \* \* \*